Patented June 22, 1926.

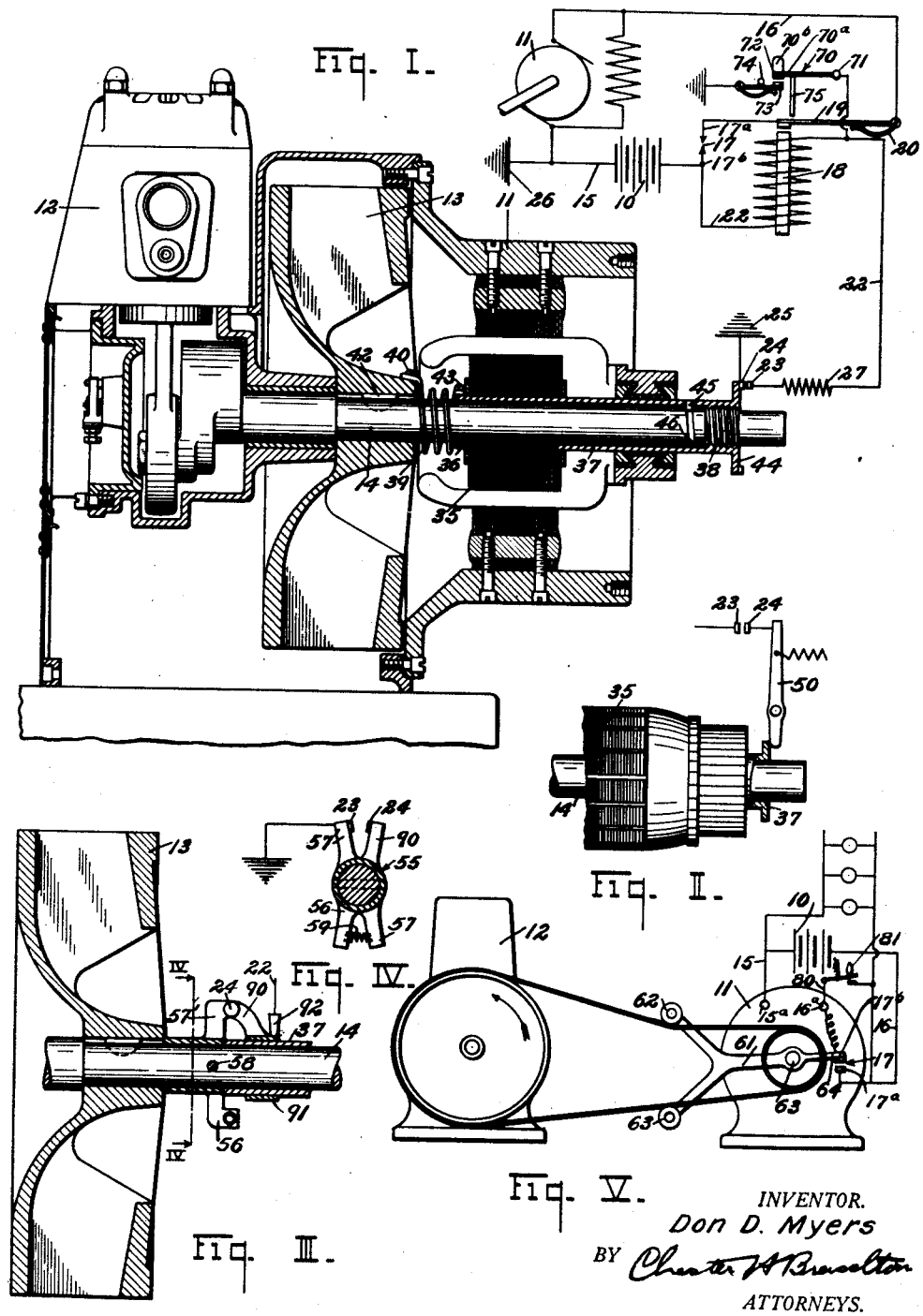

1,589,478

UNITED STATES PATENT OFFICE.

DON D. MYERS, OF TOLEDO, OHIO, ASSIGNOR TO INDUSTRIAL RESEARCH CORPORATION, OF TOLEDO, OHIO, A CORPORATION OF DELAWARE.

AUTOMATIC SWITCH FOR GENERATING SETS.

Application filed October 10, 1921. Serial No. 506,689.

The present invention relates to a means for automatically opening and closing an electric circuit, particularly adapted for use in connection with power plants for generating electricity for charging a storage battery, altho the same might have extensive utility and is not limited to this particular use.

An object of the invention is to provide an arrangement of parts which will automatically establish or disestablish an electric circuit in a system employing a dynamo electric machine operable as a generator dependent upon whether or not the machine is generating or motorizing. More specifically, it is an object of the invention to provide a system wherein an internal combustion engine drives a dynamo electric machine to charge a storage battery automatically operating means for closing the charging circuit to the battery when the engine is started and to open the charging circuit whenever current from the battery operates the dynamo electric machine as a motor as, for example, when the electromotive force of the dynamo electric machine falls below that of the battery.

A further object of the present invention is the employment of such a means in a system where the action of the dynamo electric machine as a motor or a generator merely operates a contact which in turn controls the action of the electric switch in the charging circuit referred to.

A further object of the invention is to provide particularly efficient structural means for accomplishing the objects stated utilizing, in the main, standard equipment with as little variation as possible for the adaptation of my improved switch controlling mechanism.

A further object of the present invention is to provide a structure for controlling a switch as indicated above in a type of electric generating plant in which the generator is belt driven by a source of power, such as an internal combustion engine, for example.

Other objects and those relating to simplicity of structure and economies of manufacture will appear herein as I proceed with a detailed description of that particular embodiment of my invention which for the purposes of illustration I have shown in the accompanying drawings, in which Figure I is a diagrammatic view partly in section showing an embodiment of the present invention.

Figure II is a fragmentary sectional view of a modification.

Figure III is a sectional view of a further embodiment, while

Figure IV is a sectional view taken on the line 4—4 of Figure III: and

Figure V is a diagrammatic illustration of a further embodiment of the present invention showing the application of the principle to a plant in which a source of power is belt connected to a dynamo electric machine for generating current, the circuit being controlled by the action of the machine as a generator or as a motor.

Referring to the embodiment shown in Figure I there is illustrated a storage battery 10 and a dynamo electric machine 11 which may be a generator driven by an internal combustion engine or a combined generator and motor adapted to be driven by an internal combustion engine and drive the same for starting and which may be provided with any type of regulation if used with a variable speed internal combustion engine or which may be driven at a substantially constant speed by a substantially constant speed engine as desired. In the embodiment shown a gas engine 12, having a flywheel 13 drives the shaft 14 on which the dynamo electric machine 11 is mounted.

The main circuit between the battery 10 and dynamo electric machine 11, is illustrated by the wire 15 connecting one side of the battery to one terminal of the generator and a wire 16 connecting the opposite terminals of each. A switch 17 is adapted to make and break the electric circuit between the generator and battery. To this end I have shown a solenoid armature 18 adapted to operate on the lever 19 normally spring pressed to open position by the spring 20. Adapted for manual closure of the switch 17 is a hand switch 70 pivoted at 71 and having a contact 72 designed to engage with contact 73, which latter is grounded and normally spring held against the stop 74. Depending beneath the contact arm 70ª is a post 75, operative to engage and move to closed position the switch 17, but so designed that the contacts of switch 70 engage before those of switch 17. A circuit for energizing the solenoid 18 is illustrated in a lead 22 extending from the battery through the solenoid and terminating in a contact point 23 while a movable contact 24 connects with ground at 25 while the other side of the battery is grounded at 26. If the full battery or generating current passes through the contacts 23—24 a resistance 27 may be imposed in the solenoid circuit 22 if desired.

As heretofore indicated a principal characteristic of the present invention is to provide means for automatically establishing and disestablishing the generator battery of other load circuit, depending upon whether or not the generator 11 is generating or going as a motor. To this end a simplified structure for accomplishing the same is illustrated in Figure I in which the shaft 14 may have a slidable driving connection with the armature 35 by way of a splined connection 36 to the usual quill sleeve 37 at the armature center. At any suitable portion of the shaft 14 the same may have a screw threaded engagement 38 with an armature sleeve 37. Or if needed, a spring 39 may be arranged to maintain a normal position for the armature 35 and as shown, is coiled around the shaft 14 and secured at 40 to a fixed part as, for example, the flywheel 13 which is fixed on the shaft 14 by a key 42. The other end of the spring 39 is fixed at 43 to the armature sleeve 37. Any suitable means as an arm 44 may be used to carry the contact 24 of the solenoid operating circuit 22. In the operation of the system to start the engine, it is necessary to compress the manual switch 70. Closure of contacts 72—73 energize solenoid 18 which thereupon aid the closure of main switch 17.

It will be seen that upon the gas engine 12 being started, rotation of the shaft 14 in one direction will cause a slight longitudinal movement of the armature 35 to cause the contacts 23 and 24 to be made, thereby energizing the solenoid 18, so that on the release of switch 70 energization of the solenoid and closure of switch 17 is maintained. Should the engine not start, on the release of switch 70, there is no disastrous arcing at contact points 17ᵃ and 17ᵇ since, because contacts 72 and 73 are closed, the switch 17 does not follow switch 70 and cause a drawn out arc, but, on the contrary, when contacts 72 and 73 are broken the clearance between switch arm 19 and post 75 is such as to give the spring 20 free action and a quick break with small arcing is secured. Suitable communicating stops 45 and 46 may be located between the shaft 14 and armature sleeve 37 to cause the armature to be rotated after the contacts have been made. When the electromotive force of the generator falls below a certain amount so that the battery current tends to flow in the reverse direction to operate the same as a motor, the relative torque between the shaft 14 and armature 35 will be reversed and the armature will move in a reverse direction to open the contacts 23 and 24. The spring 39 may aid in this action.

It is apparent that other means, as for example, manually operated circuits between the battery 10 and dynamo electric machine 11, may be employed to operate in combination with and without interference with the automatic operation of the means illustrated herein for controlling an electric circuit. The switch 17 may control the load circuit other than the battery circuit 10.

In Figure II as the armature 35 moves, a projection or a part of the sleeve 37 is adapted to contact with a suitable lever 50 at one end of which is located the contact 24. The operation of the modified embodiment illustrated in Figure II will be understood from the foregoing.

In Figures III and IV, I have illustrated a still further modified embodiment of the inventive idea wherein the contacts 23 and 24 are made or broken by reason of the action of a driving coupling 55 interposed at any desirable point in the connection between the source of power, as for example the internal combustion engine 12 and the dynamo electric machine 11. As shown in these figures, one arm 56 of the driving couple is fixed to the armature 35, while the other arm 57 is fixed by the pin 58 to the shaft 14, these arms having interconnection through the medium of an interposed spring 59, to drive the same. As shown in Figure IV one arm 57 is extended outwardly on the opposite side to form contact member 57', on which is mounted the grounded contact 23. The corresponding contact 24 of the solenoid circuit 22 is mounted on an arm 90 projecting from an insulated ring 91 on the armature shaft. A brush 92 bearing on the ring 91 astablishes a circuit to the solenoid 18. The operation of the modified embodiment shown in Figures III and IV will be understood from the description of the mechanism where it will be seen that upon the starting of the gas engine, jaws 57 of the coupling drive will move toward the jaws 56 until a driving relation is established between the shaft 14 and dynamo electric machine 11. In the meantime the contacts 23 and 24 are closed. Should, for any reason however, the speed of the dynamo electric machine exceed that of the shaft 14, the arms 90 and 57' will move apart, opening the contacts 23 and 24. By this means a circuit may be made or broken as in the embodiment of Figure I.

In Figure V is illustrated a still further embodiment of the present invention in which the dynamo electric machine 11 is driven by a belt as from a source of power as an internal combustion engine 12. Pivoted at the armature center of the dynamo electric machine 11 is a bifurcated arm 61 having rollers 62 and 63 located at each end of the bifurcations of the arm 61. Member 61 extends beyond the center 63 as at 64 and carries the contact 17ᵃ co-operating with the contact 17ᵇ which, in the embodiment illustrated, is in the main charging circuit 15 and 16 instead of being in the solenoid controlling circuit 22 of Figure I.

Rollers 62 engage the belt 60 and, if driven in the direction of the arrow indicated on the belt wheel of the engine 12, the tendency will be for the belt to push outwardly on the roller 62 to close the contacts 17ᵃ and 17ᵇ. Should the dynamo electric machine 11 tend to operate in the reverse direction and drive the engine 12, the tendency will be to push outward on the roller 63 to open the contacts 17ᵃ and 17ᵇ.

The diagrammatic showing of the electric circuit for this modification includes a shunt starting circuit 80, around the switch 17, in which is inserted a hand switch 81, normally held open by a spring 82. Thus in starting the manual switch is depressed and if the engine fails to start, when the switch 81 is released the dynamo stops, the switch 17 being open.

In the modified arrangements of Figure III and Figure V, I have shown the automatic switch device in either the auxiliary solenoid circuit 22 or the main circuits 15 and 16, and it should be uderstood that either switch may be positioned in either circuit as is found most efficacious for the particular installation.

While I have illustrated and described in more or less detail certain embodiments of my invention I do not wish to be limited thereto as various other modifications and arrangements will be obvious to those skilled in the art without departing from the scope of my invention. Therefore I desire to claim my invention broadly as well as specifically as indicated by the appended claims.

What I claim is:

1. In an apparatus of the character described, a dynamo electric machine and an electric circuit connected therewith, means for automatically controlling said circuit dependent upon the action of the dynamo electric machine as a motor or as a generator, including a movable armature adapted to be moved in one direction when the dynamo electric machine is driven and moved in the opposite direction when the dynamo electric machine operates as a driving member, and means controlled by the movement of said armature to effect connection or disconnection of said electric circuit including main switch contacts in said load circuit, an electromagnet operative to retain said load contacts in closed position, separable contacts operated by the movement of said armature, a second electric circuit connecting said armature contacts and said electromagnet, means for initially closing said main contacts, and a third circuit including said last named means connected in parallel with said second circuit.

2. In an apparatus of the character described, a dynamo electric machine and an electric load circuit connected therewith, switch contacts in said load circuit, and means for automatically controlling said circuit dependent upon the action of the dynamo electric machine as a motor or as a generator, including a movable armature adapted to be moved in one direction when the dynamo electric machine is driven and moved in the opposite direction when the dynamo electric machine operates as a driving member and electrical controlled means for controlling said first mentioned electric circuit including an electromagnet, an armature operated by said magnet and carrying one of said load circuit switch contacts, parallel electric circuits in series with said electromagnet, and separable contacts in each of said parallel circuits.

3. In a control system of a dynamo-electric machine having a slidable armature, the combination of a dynamo-electric machine, an electric load circuit connected therewith, switch operating means connected to said armature and operated thereby, contacts adapted to be opened and closed by said switch, an electromagnet connected to one of said contacts, and separable contacts in said first named circuit adjacent the electromagnet and adapted to be operated thereby, and means including an auxiliary switch device for preventing arcing at said first circuit contacts.

4. In a control system for electric circuits, the combination of a dynamo electric machine, a main electric load circuit having electric connection therewith, main switch contacts in said load circuit, and means for controlling the electric circuit between the dynamo electric machine and a load, comprising a drive couple interposed between a driving means for said dynamo electric machine and said dynamo electric machine, said couple including co-operating members adapted to be moved toward and away from each other contacts carried by said members a second electric circuit connected to said contacts, an electromagnet connected to said second circuit, said electromagnet being adapted to move said load switch to open or closed position, and a third circuit connected to said electromagnet in parallel with said second circuit and having means for modifying the movement of said load circuit switch.

5. In a control system for electric circuits, a dynamo-electric machine having an axially slidable armature, a load circuit connected to said dynamo-electric machine, separable contacts in said load circuit, one of which is movable relative to the other, an electromagnet positioned in operative relationship to said contacts, a movable armature adjacent said electromagnet, said armature carrying said movable contact and adapted to move the same to closed position, two parallel circuits connected in series with said electromagnet, separable contacts formed in one of said parallel circuits adapted to be opened and closed by the movement of said slidable armature, separable contacts in the other of said parallel circuits, and means attached to one of said last named separable contacts adapted to engage said magnet armature when moved in one direction.

6. In a control system for electric circuits, the combination of a dynamo-electric machine having an axially slidable armature, a load circuit connected to said dynamo-electric machine, switch contact elements in said load circuit, and means for preventing excessive arcing on the separation of said switch contacts, said means including an electromagent, an armature movable in relation to and energized by said electromagnet, said armature carrying one of said switch contacts, an electric circuit connecting said electromagent with said dynamo-electric machine, a switch operated by the movement of said slidable dynamo armature to open and closed position interposed in said last named circuit, a third circuit connected in parallel to said second circuit, and in series with said electromagnet, separable switch contacts in said third circuit, and a switch arm supporting one of said last named contacts having means for closing said main contact switch and means for causing a quick break of said main switch.

7. In an electric control system, the combination of a dynamo-electric machine having a slidable armature and adapted to be operated both as a motor and as a generator, a load circuit electrically connected with said dynamo-electric machine, switch contacts interposed in said load circuit, an electromagnet connected to said load circuit for holding said load circuit contacts closed when the dynamo is operating as a generator, switch contacts adjacent to and operated by said movable dynamo-electric armature, said last named contacts being normally open when the dynamo is operating as a motor and closed when the dynamo is operating as a generator, circuit connections intermediate said dynamo armature contacts and said electromagnet, manual means for initially closing said load circuit contacts, and additional means for preventing excessive arcing of said load circuit contacts when said contacts are opened.

8. In an electric control system, the combination of a dynamo-electric machine having a slidable armature and adapted to be operated both as a motor and as a generator, a load circuit electrically connected with said dynamo-electric machine, switch contacts interposed in said load circuit, an electromagnet connected to said load circuit for holding said load circuit contacts closed when the dynamo is operating as a generator, switch contacts adjacent to and operated by said movable dynamo-electric armature, said last named contacts being normally open when the dynamo is operating as a motor and closed when the dynamo is operating as a generator, circuit connections intermediate said dynamo armature contacts and said electromagnet, manual means for initially closing said load circuit contacts, and additional means for preventing excessive arcing of said load circuit contacts when said contacts are opened, said means including separable contacts connected in series with and operated by said manual means and in series with said electromagnet.

9. In an electric control system, the combination of a dynamo-electric machine having a slidable armature, a load circuit connected to said armature, a main switch in series with said load circuit, a secondary switch connected to and operated by said slidable armature, electromagnetic means for operating said main switch, an electric circuit connecting said electromagnetic means and said secondary switch and means for preventing excessive arcing between said main switch contacts.

In testimony whereof, I affix my signature.

DON D. MYERS.